Nov. 23, 1943. M. C. MARSH 2,335,072
INSTRUMENT SUSPENSION SYSTEM
Filed Sept. 16, 1942
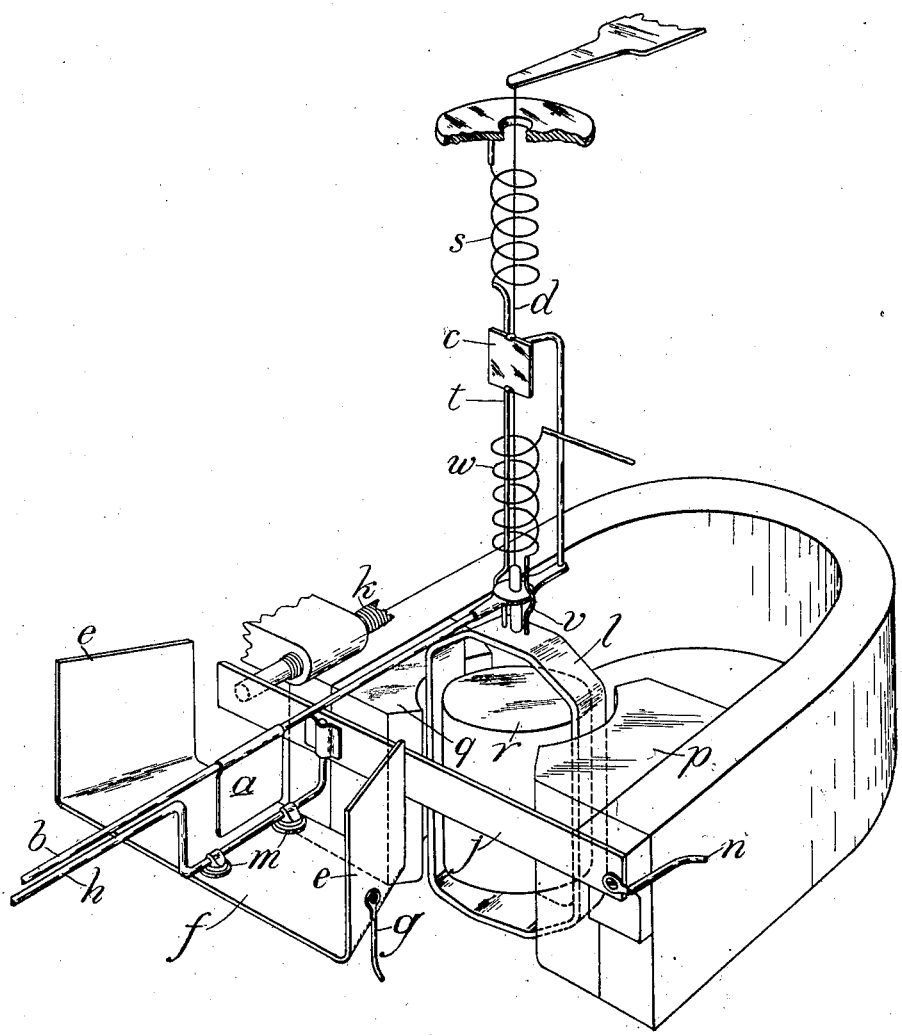
Inventor
M.C.Marsh
By Glascock Downing & Seebold
Attys Patented Nov. 23, 1943

2,335,072

UNITED STATES PATENT OFFICE 2,335,072

INSTRUMENT SUSPENSION SYSTEM

Malcolm Charles Marsh, Cambridge, England, assignor to Cambridge Instrument Company, Limited, Cambridge, England Application September 16, 1942, Serial No. 458,597
In Great Britain July 25, 1941

6 Claims. (Cl. 171—95)

This invention relates to instrument suspension systems.

It is a common practice in scientific instruments to suspend a rotatable system on a fine filament or thread when friction has to be avoided. In order to gain sensitivity it is often desirable to reduce the thickness of the suspending filament or thread but limitations are imposed on this process by the necessity of retaining sufficient strength in the thread to support the suspended element under normal conditions of use, or alternatively, by the necessity of keeping a low electrical resistance in order to prevent the filament or thread becoming over-heated by the passage of the necessary electric current.

The main object of this invention is to allow a thick filament or thread to be used having sufficient mechanical strength and low electrical resistance, the greater torsional control being neutralised to the extent desired.

It is the property of many such mechanical systems in which the rotatable member moves under the influence of elastic, electric, magnetic, electro-magnetic or gravitational forces, that the restoring force or torque acting on the moving member is very nearly proportional to the displacement of that member from its equilibrium position and is directed towards that position. When displacements are relatively small this proportionality holds with considerable accuracy and gives rise to simple harmonic motion which is so frequently met with in such cases.

A further object of this invention is to produce a force or torque directed away from the equilibrium position on the moving member proportional to the displacement of that member from that position.

The invention consists in brief in an instrument suspension system comprising a suspended element, two fixed members adjacent thereto, a movable member rigid with said system disposed between two said fixed members, means for maintaining said movable member at one electrical potential and means for maintaining the said fixed members at another electrical potential, the distance separating the said movable member from the said fixed members being large in comparison with the maximum movement of said movable member.

The accompanying diagrammatic drawing illustrates a perspective view of part of a Grassot fluxmeter embodying the present invention in one form.

In carrying the invention into effect in one convenient form by way of example as applied to a fluxmeter of the totally suspended Grassot type as illustrated a coil $l$ is provided moving between the poles $pq$ of a permanent magnet and a cylindrical corepiece $r$ to give a radial magnetic field. The torsional control on the suspended coil is reduced as much as possible by suspending the coil on a silk filament $d$ from a suitable support and current is led to the coil by a very thin ligament $s$ and the stiff wire $t$ and from the coil by the wire $v$ and ligament $w$. The deflections of the coil may be measured by the pointer $b$ or by the mirror $c$ using the normal arrangement of lamp and scale as with galvanometers.

In order to counteract the torque exerted by the silk filament and the two ligaments as much as possible since this torque causes drift of the coil which under some circumstances introduces grave errors into the indication of the instrument, the torque is reduced in accordance with the present invention by a system of electrostatic forces between a plate $a$ attached to the pointer $b$ and fixed plates $ee$. The plate $a$ is electrically connected to the pointer $b$ which is held at approximately earth potential by connecting it to one of the wires $t$ or $v$ leading to the coil and arranging that the external circuit is earthed at some point. The plates $ee$ are connected together for convenience by a plate $f$ supported on insulating bushes $m$ and is connected to a source of voltage, either alternating or direct, by the wire $g$. The voltage can be varied by using a tapped battery or tapped transformer or by means of a potentiometer, either of the stud or continuously variable type across a battery or transformer. In all cases the terminal which is not connected to the wire $g$ is earthed. With the arrangement indicated, electrostatic forces are set up which result in a torque being applied to the suspended system proportional to its deflection from a zero position and directed away from that position. The torque is also proportional to the square of the applied voltage and so can be adjusted to balance out the mechanical torque by choosing an appropriate voltage.

Two fixed metal plates $ee$ are disposed radially and symmetrically on either side of the movable plate $a$ when the latter is at its central or zero position, the distance separating the movable from the fixed plates being large compared with that through which the movable plate moves when the suspended element makes its maximum deflection.

The arrangement is such that this torque is always opposed to the torque imposed by the thread $d$ and ligaments $sw$ and by adjusting the applied voltage the resultant torque may be reduced to any desired extent over the small angles for which the above law holds true.

The proportionate reduction of the restoring force or torque when acting on the moving system in an instrument, e. g. a galvanometer, results in an increase in sensitivity and if desired a switch may be provided which enables different potentials to be applied as desired, thus giving a range of known sensitivities to the instrument. Alternatively a potential divider which gives a continuous adjustment of sensitivity may be provided.

In order to be able to restore the suspended system to a definite zero position, a stiff wire $h$ is provided which is supported by a strip $j$. If a voltage either alternating or direct of the order of 200 volts is applied to the wire $h$ by means of the connection $n$ the pointer $b$ which is earthed is brought rapidly back until it lies immediately above $h$. The position of $h$ can be adjusted by the screw $k$ which deflects the strip $j$. The wire $h$ actually supports the plates $efe$ as it is convenient that the pointer $b$ and plate $a$ should always have a zero position symmetrical with the plates $ee$ and this can easily be arranged in construction.

The invention may be applied advantageously to suspended galvanometers where it is desirable to reduce the torque of the suspension so as to gain greater sensitivity.

Instead of employing plates as the members carrying the electrostatic charges, these may comprise wires, gauze or conducting films deposited on insulators as may be convenient.

The applications of this invention include the following:

(a) The increase in sensitivity of galvanometers and all associated electrical instruments, geo-physical instruments for measuring gravitational fields and their variations, magnetometers and balances of high sensitivity particularly of the type often referred to as micro balances. The fact that the sensitivity can be changed in known steps or continuously is important.

(b) The complete neutralisation of unwanted torsional effects of moving systems as in the case of the Grassot fluxmeter where a suitable error may be introduced by the torsion due to the ligaments which are necessary to lead in and lead out the current from the coil.

(c) By a combination of electrostatic forces and normal elastic controlling forces acting on the moving system of an instrument, instruments may be produced having a non-linear relationship between the deflection and resultant restoring force. To secure such arrangement the best position of the moving and fixed members will not be as simple as in the case of the examples mentioned above. An approximate solution to the problem of correctly disposing the various parts may be obtained by considering small elementary areas on each of the parts and calculating the results on the basis of the inverse square law between charges situated on these elementary areas.

An example of a non-linear scale is the use of electrostatic repulsion in place of stops in a galvanometer, thus avoiding the trouble usually experienced with the normal type of stops.

I claim:

1. An instrument suspension system comprising a suspension filament, a movable element suspended by the suspension filament element, two fixed members adjacent said filament, a movable member rigid with said element and disposed between said fixed members, means for maintaining said movable member at one electrical potential and means for maintaining the said fixed members at another electrical potential, the distance separating the said movable member from the said fixed members being large in comparison with the maximum movement of said movable member.

2. An instrument suspension system as claimed in claim 1, wherein either the movable or the fixed members are at earth potential.

3. An instrument suspension system as claimed in claim 1, wherein the difference of potential between the fixed members and the moving member is an alternating potential.

4. An instrument suspension system as claimed in claim 1 applied to a suspended flux meter of the Grassot type.

5. An instrument suspension system as claimed in claim 1 applied to a galvanometer.

6. An instrument suspension system as claimed in claim 1, wherein the moving system has a non-linear relationship between deflection and resultant restoring force.

MALCOLM CHARLES MARSH.